United States Patent
Yanakawa

(10) Patent No.: US 11,491,548 B2
(45) Date of Patent: Nov. 8, 2022

(54) MACHINE TOOL SYSTEM THAT RESTRICTS PARALLEL EXECUTION OF PREDETERMINED OPERATIONS BY DIFFERENT TOOLS

(71) Applicants: CITIZEN WATCH CO., LTD., Tokyo (JP); CITIZEN MACHINERY CO., LTD., Nagano (JP)

(72) Inventor: Shozen Yanakawa, Sayama (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 278 days.

(21) Appl. No.: 16/651,825

(22) PCT Filed: Sep. 6, 2018

(86) PCT No.: PCT/JP2018/032989
§ 371 (c)(1),
(2) Date: Mar. 27, 2020

(87) PCT Pub. No.: WO2019/065138
PCT Pub. Date: Apr. 4, 2019

(65) Prior Publication Data
US 2020/0254642 A1    Aug. 13, 2020

(30) Foreign Application Priority Data
Sep. 28, 2017   (JP) ............................. JP2017-187992

(51) Int. Cl.
*B23B 3/00*      (2006.01)
*G05B 19/18*     (2006.01)
(Continued)

(52) U.S. Cl.
CPC ................ *B23B 3/00* (2013.01); *G05B 19/18* (2013.01); *G05B 19/4141* (2013.01); *G05B 19/4155* (2013.01); *G05B 2219/50008* (2013.01)

(58) Field of Classification Search
CPC ...... B23B 3/00; G05B 19/18; G05B 19/4141; G05B 19/4155; G05B 2219/50008;
(Continued)

(56) References Cited

U.S. PATENT DOCUMENTS

| | | | |
|---|---|---|---|
| 4,987,807 A | * | 1/1991 | Simon .................. B23Q 39/048 82/124 |
| 5,591,528 A | | 1/1997 | Fisher et al. |

(Continued)

FOREIGN PATENT DOCUMENTS

| | | |
|---|---|---|
| CN | 1394157 A | 1/2003 |
| CN | 103430112 A | 12/2013 |

(Continued)

OTHER PUBLICATIONS

Office Action received in Taiwanese Application No. 107131846 dated Apr. 7, 2022.

*Primary Examiner* — Kenneth M Lo
*Assistant Examiner* — Jonathan Michael Skrzycki
(74) *Attorney, Agent, or Firm* — Knobbe, Martens, Olson & Bear, LLP

(57) ABSTRACT

The machine tool includes modules and a control portion. Each of the modules includes a main spindle for holding a workpiece and a tool post for holding a tool. The tool is used to machine the workpiece held by the main spindle. The control portion is configured to control to restrict a parallel execution of predetermined machining for the workpiece (Continued)

and machining affected by the predetermined machining and to permit an execution of machining other than the restricted machining.

6 Claims, 4 Drawing Sheets

(51) Int. Cl.
*G05B 19/4155* (2006.01)
*G05B 19/414* (2006.01)

(58) Field of Classification Search
CPC ........... G05B 2219/50088; G05B 2219/49382; B23Q 1/0045
See application file for complete search history.

(56) References Cited

U.S. PATENT DOCUMENTS

| | | | |
|---|---|---|---|
| 9,358,653 B2 | 6/2016 | Hessbrueggen | |
| 9,857,790 B2 | 1/2018 | Maseki et al. | |
| 10,095,222 B2 | 10/2018 | Morita et al. | |
| 10,589,367 B2 | 3/2020 | Sannomiya et al. | |
| 10,850,357 B2 | 12/2020 | Ibarra et al. | |
| 2003/0023341 A1 | 1/2003 | Sagawa et al. | |
| 2004/0211301 A1* | 10/2004 | Kobayashi | B23B 3/168 82/129 |
| 2005/0021169 A1* | 1/2005 | Sagawa | G05B 19/4093 700/180 |
| 2005/0038552 A1 | 2/2005 | Sagawa et al. | |
| 2009/0271017 A1* | 10/2009 | Yazaki | B23B 1/00 700/97 |
| 2013/0331956 A1 | 12/2013 | Kasuya | |
| 2016/0246283 A1 | 8/2016 | Oota | |
| 2017/0293288 A1 | 10/2017 | Nakaya et al. | |

FOREIGN PATENT DOCUMENTS

| | | | |
|---|---|---|---|
| CN | 104107922 A | 10/2014 | |
| CN | 104914791 A | 9/2015 | |
| CN | 105911964 A | 8/2016 | |
| CN | 106163735 A | 11/2016 | |
| CN | 106794521 A | 5/2017 | |
| CN | 106794565 A | 5/2017 | |
| CN | 106997193 A | 8/2017 | |
| DE | 102016001634 A1 | 8/2016 | |
| EP | 2693283 A2 | 2/2014 | |
| EP | 3205448 A1 | 8/2017 | |
| JP | 2002/132318 A | 5/2002 | |
| JP | 2002/268715 A | 9/2002 | |
| JP | 2002268715 * | 9/2002 | ............... B23B 1/00 |
| JP | 2009/110223 A | 5/2009 | |
| JP | 2013/025727 A | 2/2013 | |
| JP | 2014/235466 A | 12/2014 | |
| JP | 2016/153938 A | 8/2016 | |
| KR | 20-2014-0012971 A | 2/2014 | |
| KR | 10-2017-0053725 A | 12/2017 | |
| TW | 2012/38698 A | 10/2012 | |
| TW | 2016/25378 A | 7/2016 | |
| WO | WO 2002/034463 A1 | 5/2002 | |
| WO | WO 2012/132933 A1 | 10/2012 | |
| WO | WO 2016/056504 A1 | 4/2016 | |

\* cited by examiner

MACHINE TOOL SYSTEM THAT RESTRICTS PARALLEL EXECUTION OF PREDETERMINED OPERATIONS BY DIFFERENT TOOLS

CROSS-REFERENCE TO RELATED APPLICATION

This application is a national stage application of PCT Application No. PCT/JP2018/032989, filed on Sep. 6, 2018, which claims the benefit of priority to Japanese Patent Application No. 2017-187992 filed on Sep. 28, 2017, the entire disclosure of which is incorporated herein by reference.

TECHNICAL FIELD

The present disclosure relates to a machine tool.

BACKGROUND ART

A machine tool including a plurality of machining portions each having a main spindle and a tool post is known in the art. The machine tool performs operations such as machining on a plurality of workpieces in parallel by transferring the workpieces between the machining portions (see Patent Literature I: JP2002-268715A, for example). In the machine tool disclosed in Patent Literature I, two machining portions are disposed on the same bed. Accordingly, the vibration during machining in the first machining portion may affect the machining quality in the second machining portion. To prevent this, the machining in the second machining portion is restricted during the machining in the first machining portion.

Patent Literature II (JP2009-110223A) discloses a machine tool which controls the axis of a feed shaft for a workpiece and the main spindle for holding a tool or the like based on an instruction in a machining program. In Patent Literature II, the machine tool is controlled not to drive a predetermined axis in response to a drive prohibition command in the machining program to prohibit the drive of the predetermined axis.

SUMMARY

However, in Patent Literature I, the entire operation in the second machining portion is stopped during the machining in the first machining portion, which may increase the cycle time. Further, in Patent Literature II, the machining is not restricted in the plurality of machining portions but the drive of the axis is restricted only in one of the machining portions.

Considering the above, an object of the present disclosure is to provide a machine tool with excellent machining accuracy and productivity, which prevents a predetermined operation from affecting other operations and suppresses an increase in cycle time when executing operations in parallel on workpieces held by workpiece holders.

To achieve the above object, the machine tool in the present disclosure includes a plurality of workpiece holders configured to hold a workpiece, a plurality of working portions configured to perform an operation on the workpiece, respectively, a plurality of working portion holders corresponding to the plurality of workpiece holders, and a control portion. The control portion is configured to control the workpiece holders and the working portion holders so that the working portion holders hold the respective working portions and the working portions perform the operations on the workpiece held by the corresponding workpiece holder. Further, the control portion is configured to control to restrict a parallel execution of a predetermined operation and an operation to be affected by the predetermined operation and to permit a parallel operation of operations other than the restricted operations.

DETAILED DESCRIPTION

Figure 1:
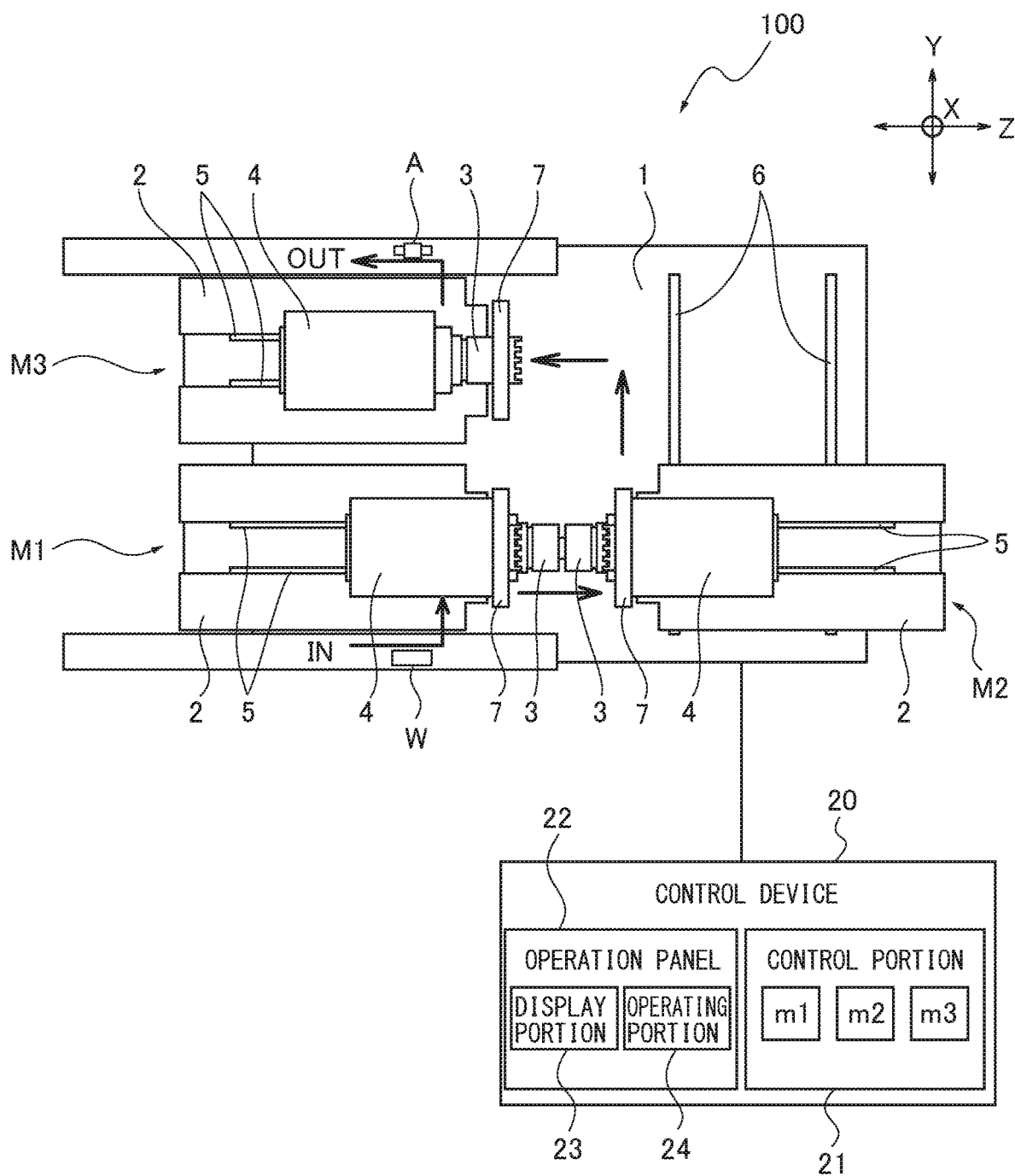
FIG. 1 is a plane view illustrating an overall configuration of a machine tool according to an embodiment of the present disclosure.

As shown in FIG. 1, a machine tool 100 (an automatic lathe) according an embodiment of the present disclosure includes a bed 1. Three modules M1, M2, M3 are disposed on the bed 1.

Hereinafter, as shown in FIG. 1, an axial direction of each main spindle 3 of the modules M1, M2, M3 is referred to as a Z-axis direction. A horizontal direction perpendicular to the Z-axis direction is referred to as a Y-axis direction. A vertical direction perpendicular to the Z-axis and Y-axis directions is referred to as an X-axis direction.

The modules M1, M2, M3 have the same basic configurations. Each of the modules includes a base 2, the main spindle 3 (workpiece holder) and a headstock 4. The headstock 4 is disposed on the base 2 to hold the main spindle 3. Further, each of the modules further includes a tool post 7 (working portion holder) disposed on the base 2. The tool post 7 configured to hold a tool (working portion) for machining a workpiece W held by the main spindle 3.

A pair of guide rails 5 are provided on each of the base 2. The guide rails 5 are arranged in the Y-axis direction and extend in the Z-axis direction parallel to each other. The headstock 4 is slidably disposed on the guide rails 5. Specifically, the headstock 4 is configured to slide in the Z-axis direction by a moving mechanism.

The two modules M1, M3 are arranged on the bed 1 in parallel with each other along the Z-axis direction. The bases 2 of the modules M1, M3 are fixed on the bed 1.

A pair of guide rails 6 are provided on the other side of the bed 1 opposite to the side where the modules M1, M3 are disposed. The guide rails 6 are arranged in the Z-axis direction and extend in the Y-axis direction between a position to face the module M1 and a position to face the module M3. The base 2 of the module M2 is disposed on the guide rails 6 to slide in the Y-axis direction by a drive mechanism such as ball screws.

Hereinafter, the module M2 disposed on the guide rails 6 is referred to as "the movable module", while the modules M1, M3 immovably disposed on the bed 1 are referred to as "the fixed modules".

The movable module M2 is configured to move on the guide rails 6 between the fixed modules M1, M3. Thereby, the movable module M2 moves to positions to face the fixed modules M1, M3 so that the axis of the main spindle in the movable module M2 is linearly aligned with the respective axes of the main spindles in the fixed modules M1, M3.

The machine tool 100 includes a control device 20. The control device 20 is configured to control the machine tool 100, specifically, the drive of the modules M1, M2, M3, the moving mechanisms for the headstocks 4, and a drive portion of the drive mechanism for the movable module M2.

In each of the modules M1, M2, M3, the control device 20 controls the drive portion while the main spindle 3 holds the workpiece W. Thereby, the main spindle 3 rotates, the headstock 4 moves in the Z-axis direction, and the tool post 7 moves in the X-axis and Y-axis directions. Accordingly, the machine tool 100 can machine the workpiece W into a predetermined shape by selecting a predetermined tool in the tool post 7.

The movable module M2 is moved to face the fixed module M1 or the fixed module M3 and align the axes of the main spindles relative to each other. Then, the headstocks 4 are moved close to each other. Thereby, the workpiece can be transferred between the movable module M2 and the fixed modules M1, M3.

The machine tool 100 is configured by combining the modules M1, M2, M3 that function as separate lathes. In the machine tool 100, under the control of the control device 20, the workpiece W is sequentially transferred among the modules M1, M2, M3 as shown in FIG. 1 with arrows, and machining on the workpieces W is performed in the modules M1, M2, M3 in parallel to produce a predetermined product A.

In this embodiment, the fixed module M1 performs vibration machining for cutting the workpiece W by vibrating the tool or the like. The movable module M2 performs rough machining on the workpiece W and drilling to form an opening in the workpiece W. The fixed module M3 performs grooving to form a groove on the outer circumference of the workpiece W and finishing, which is precision machining.

In this embodiment, the modules M1, M2, M3 are illustrated as the modules to perform lathe-turning, each of which includes the main spindle 3 for holding the workpiece W and the tool post 7 for holding the tool for machining the workpiece W held by the main spindle 3. However, the modules M1, M2, M3 are not limited to the ones in this embodiment. The present disclosure may be applied to a machine tool including modules, at least one of which may perform machining such as grinding, milling, gear cutting. Alternatively, a predetermined module may be a tool post 7 independently provided on the bed 1 to move in the X-axis direction, the Y-axis direction, or the Z-axis direction.

As shown in FIG. 1, the control device 20 includes a control portion 21 and an operation panel 22. The control portion 21 includes a CPU, a memory (storage portion) and the like. The control portion 21 is configured to control the respective parts of the machine tool 100 by software or hardware, i.e. by programs stored in the storage portion, hardware provided in the control device 20, or the like.

The control portion 21 includes three control systems m1, m2, m3 which control the modules M1, M2, M3, respectively. The drive axes of the modules M1, M2, M3 are assigned to the control systems m1, m2, m3, respectively. The control portion 21 is configured to control the modules M1, M2, M3 in accordance with a multisystem machining program stored in the memory or the like.

Figure 2:
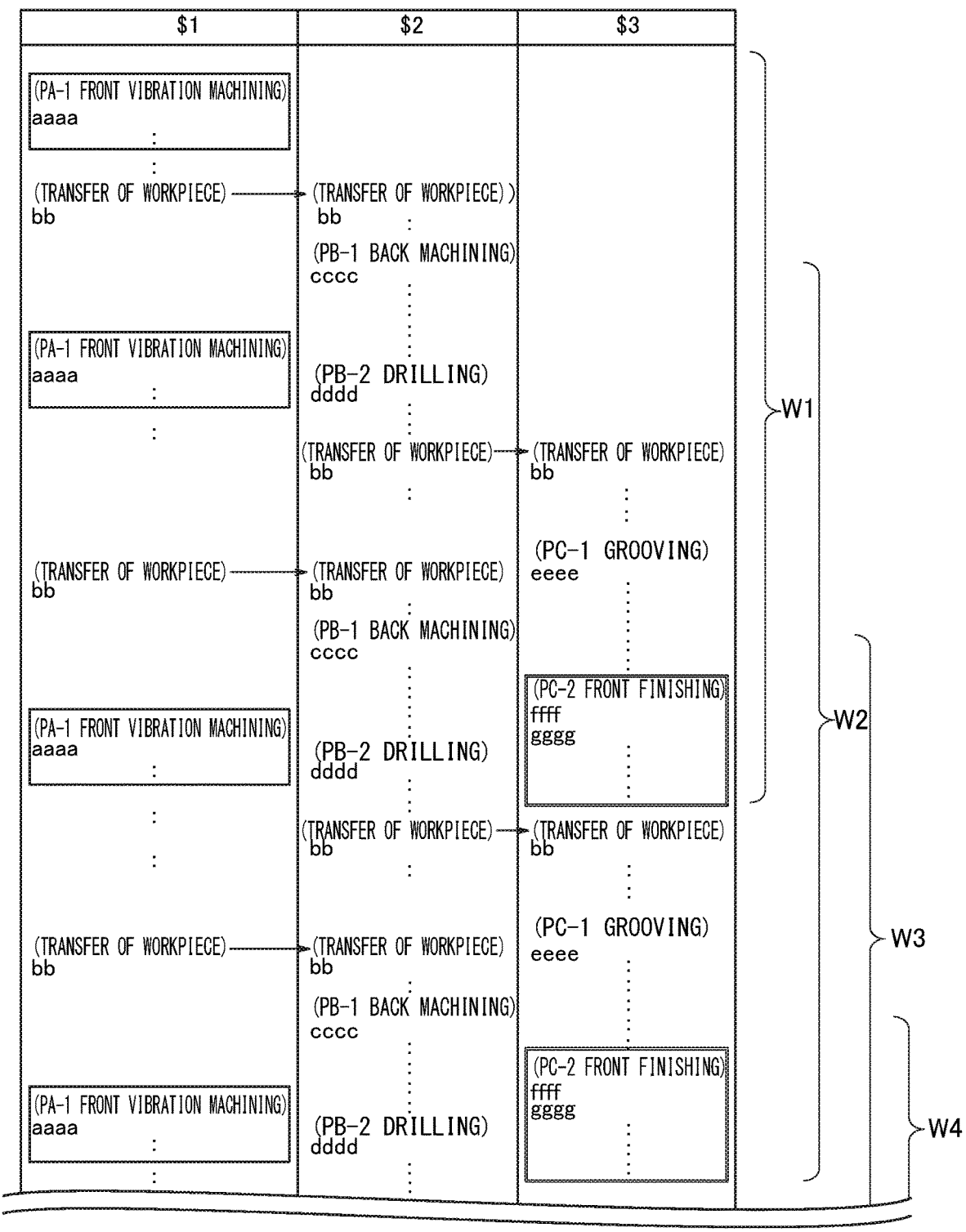
FIG. 2 is a schematic view partially illustrating an example of machining programs for control systems.

As shown in FIG. 2, the multisystem machining program in the embodiment includes three storing areas $1, $2, $3. The three storing areas $1, $2, $3 are arranged in parallel.

Each of the storing areas $1, $2, $3 includes a machining program for the control system. In the example shown in FIG. 2, the machining programs written in the storing areas $1, $2, $3 constitute the multisystem machining program.

The storing area $1 includes the machining program corresponding to the first control system m1. The storing area $2 includes the machining program corresponding to the second control system m2. The storing area $3 includes the machining program corresponding to the third control system m3.

The control portion 21 sequentially reads the machining programs in the storing areas $1, $2, $3 to execute the machining programs. Thereby, the control portion 21 independently controls each of the control systems (i.e. the first control system m1, the second control system m2, and the third control system m3) corresponding to each of the machining programs.

In the embodiment, the drive axes of the fixed module M1 are assigned to the first control system m1. The drive axes of the movable module M2, which includes the drive mechanism, are assigned to the second control system m2. The drive axes of the fixed module M3 are assigned to the third control system m3.

Accordingly, the first control system m1 of the control portion 21 controls the fixed module M1. The second control system m2 controls the movable module M2 including the movement in the Y-axis direction. The third control system m3 controls the fixed module M3. Thereby, the control portion 21 controls not only the overall operation of the machine tool 100 but also the transferring and machining of the workpieces by the modules M1, M2, M3.

The operation panel 22 includes a display portion 23, an operating portion 24 and the like. The display portion 23 is configured to display information such as operation status, and operation instructions of the machine tool 100. The operating portion 24 includes buttons, a keyboard, a touch panel or the like for operations such as input to the machine tool 100.

The multisystem program is written via the operating portion 24 or an external personal computer. The multisystem program includes the machining programs for the control systems in the storing areas $1, $2, $3, respectively. FIG. 2 illustrates the example of the machining programs. Instruction codes "aaaa", "bb", "cccc" and the like are shown in FIG. 2. The instruction codes are used to instruct the execution of various operations such as the movement and the rotation of the drive axes.

In the example shown in FIG. 2, the machining program is written in the storing area $1 corresponding to the first control system m1. The machining program includes a program (instruction code group) for executing front vibration machining PA-1 and a program for executing the transferring (loading) of the workpieces W to the movable module M2. These programs are repeated in a time series in accordance with the number of the workpieces W (W1, W2, W3, W4, ... ) to be machined.

The machining program is written in the storing area $2 corresponding to the second control system m2. The machining program includes a program for executing the reception of the workpieces W from the fixed module M1, a program for executing back machining PB-1, a program for executing drilling PB-2, and a program for executing the transferring of the workpieces W to the fixed module M3. These programs are repeated in a time series in accordance with the number of the workpieces W (W1, W2, W3, W4, ... ) to be machined.

The machining program is written in the storing area $3 corresponding to the third control system m3. The machining program includes a program for executing the reception of the workpieces W from the movable module M2, a program for executing grooving PC-1 to form grooves in the workpieces W, and a program for executing front finishing PC-2 on the front sides of the workpieces W. These programs are repeated in a time series in accordance with the number of the workpieces W (W1, W2, W3, W4, . . . ) to be machined.

According to the machining programs shown in FIG. 2, the front vibration machining PA-1 on the third workpiece W3 in the fixed module M1 (the first control system m1) is executed in parallel with the front finishing PC-2 on the first workpiece W1 in the fixed module M3 (the third control system m3). Also, the front vibration machining PA-1 on the fourth workpiece W4 is executed in parallel with the front finishing PC-2 on the second workpiece W2. The same applies to the fifth and subsequent workpieces.

The modules M1, M2, M3 are disposed on the same bed 1. Accordingly, the vibration generated by machining of the workpiece W in one of the modules is easily transmitted to the other modules. Therefore, the machining accuracy of the front finishing PC-2, which requires relatively high machining accuracy, may be affected by the relatively large vibration of the front vibration machining PA-1. Accordingly, it is undesirable to execute the machining and the finishing in parallel.

To prevent the influence of the vibration caused by the front vibration machining PA-1 on the machining accuracy of the front finishing PC-2, the control portion 21 controls so that the front finishing PC-2 in the fixed module M3 is not executed in parallel with the front vibration machining PA-1 when the fixed module M1 performs the front vibration machining PA-1.

In this embodiment, an axis to be stopped is designated not to operate the machining and the stop range of the operation of the designated axis is set in a predetermined instruction of the machining program for each of the control systems m1, m2, m3. Thereby, the control portion 21 restricts the operation of the control system corresponding to the designated axis. For example, the designation of the axis and the setting of the stop range of operation of the designated axis may be made when the machining programs for the control systems are written via the operating portion 24 or the like. Specifically, a start instruction code for the vibration machining ("aaaa" shown in FIG. 3) is an instruction code which designates the axis to be stopped as a parameter. In the machining program in the first control system m1, the X-axis ("X3") and the Z-axis ("Z3") of the fixed module M3 are designated as the axes to be stopped in the start instruction code (the third "aaaa" shown in FIG. 3) for the front vibration machining PA-1 on the third and subsequent workpieces W as parameters. A termination instruction code ("nnnn" shown in FIG. 3) for terminating the vibration machining is an instruction code including the cancellation of the stop of the axis. The final instruction code for the front vibration machining PA-1 is set as the termination instruction code ("nnnn"). The instruction code designating the axis and the instruction code for cancelling the stop of the axis are written in the storing area $1 shown in FIG. 3 for the machining program of the first control system m1.

For setting the stop range of the operation of the designated axis, a declaration start instruction code ("mmmm s1" shown in FIG. 3) and a declaration end instruction code ("mmmm s2" shown in FIG. 3) are predetermined. The declaration start instruction code declares to the control portion 21 that the machining may be affected by the predetermined operation (e.g. machining). The declaration start instruction code "mmmm s1" is provided for the machining program for the operation affected by the predetermined operation before the start of the front finishing PC-2 in the third control system m3 which controls the fixed module M3 where the influence of vibration by the front vibration machining PA-1 in the fixed module M1 cannot be ignored. The declaration end instruction code "mmmm s2" is provided after the termination of the front finishing PC-2. The declaration start instruction code "mmmm s1" and the declaration end instruction code "mmmm s2" are written in the storing area $3 in FIG. 3 for the machining program of the third control system m3.

Figure 3:
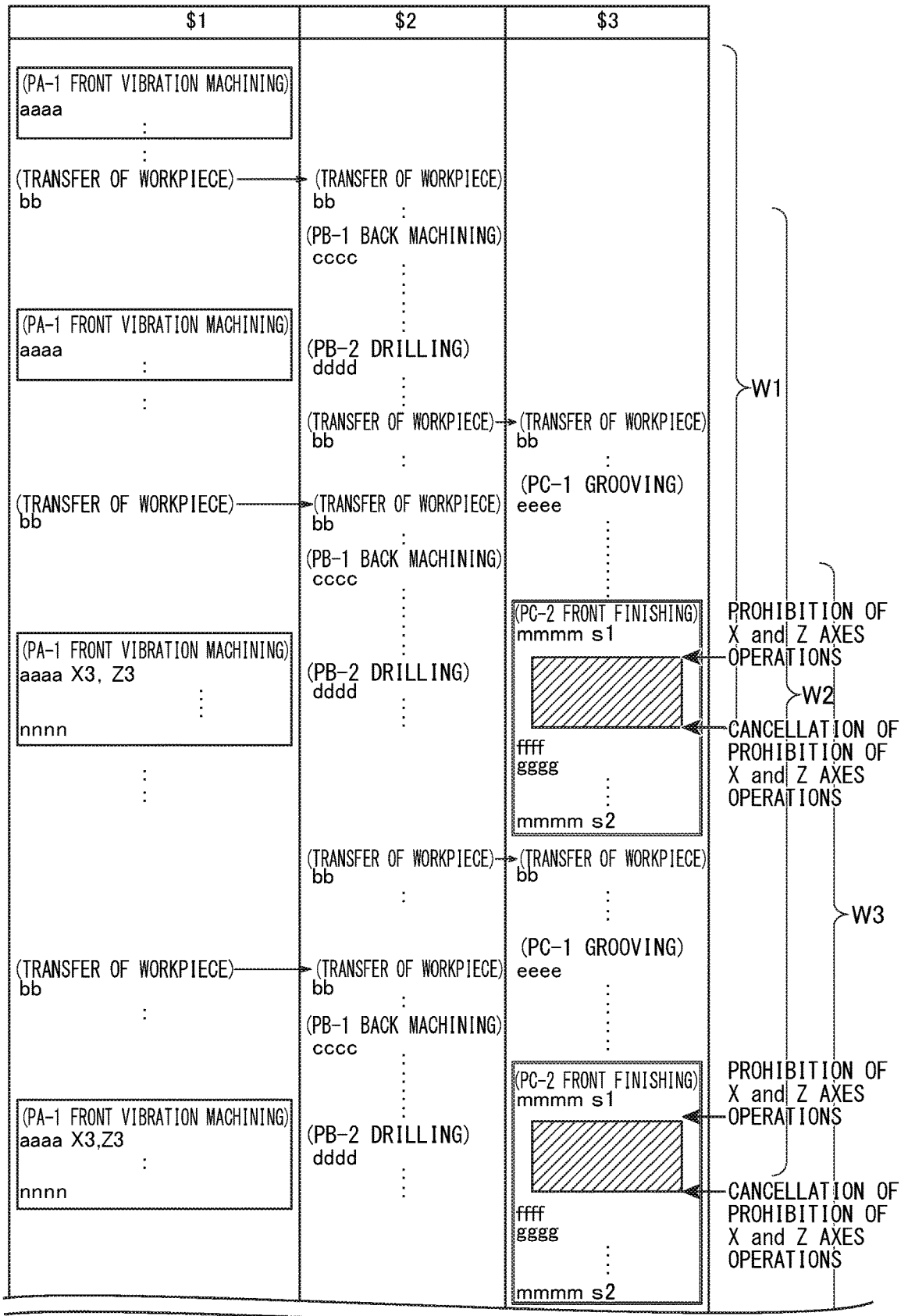
FIG. 3 is a schematic view illustrating the machining programs in FIG. 2 to which instruction codes are added to stop finishing in a third control system during vibration machining in a first control system.

As shown in FIG. 3, the declaration start instruction code "mmmm s1" is provided before the start of the front finishing PC-2 while the declaration end instruction code "mmmm s2" is provided after the termination of the front finishing PC-2 in the machining program for the third control system m3. Thereby, the control portion 21 stops the front finishing PC-2 programmed after the declaration start instruction code "mmmm s1" during the front vibration machining PA-1 between the start instruction code "aaaa" and the termination instruction code "nnnn" for the front vibration machining PA-1. After the cancellation of the stop of the axis by the execution of the termination instruction code "nnnn", the control portion 21 performs the front finishing PC-2 by the execution of the instruction codes such as the movement instruction code 'ffff' or the machining instruction code "gggg" programmed after the declaration start instruction code "mmmm s1". The movement instruction code "ffff" is a code for moving the X-axis and the Z-axis to the initial positions.

The control portion 21 reads the machining programs of the control systems. When the control portion 21 reads the start instruction code "aaaa" and an axis to be stopped as parameters in the machining program for the first control system m1, the read axis is set to a state to be stopped. At this time, when the declaration start instruction code "mmmm s1" is read in the machining program of the third control system m3, the control portion 21 stops the operation of the read axis and restricts the executions of "ffff" and "gggg" programmed after the declaration start instruction code "mmmm s1". When the front vibration machining PA-1 is terminated, and the termination instruction code "nnnn" is read in the machining program of the first control system m1, the stop of the operation of the read axis is canceled. Thereby, the control portion 21 starts the front finishing PC-2 by reading the instruction codes such as "ffff", "gggg" programmed after the declaration start instruction code "mmmm s1". The control portion 21 detects the termination of the front finishing PC-2 upon reading the declaration end instruction code "mmmm s2" in the machining program of the third control system m3. The shaded areas in FIG. 3 schematically show that the machining in the fixed module M3 is stopped since the front vibration machining PA-1 is executed between the start instruction code "aaaa" and the termination instruction code "nnnn".

Restricting the execution of the front finishing PC-2 during the front vibration machining PA-1 generates the time difference between the front vibration machining PA-1 and the front finishing PC-2. When the front finishing PC-2 is not performed but another machining is performed during the front vibration machining PA-1, the declaration start instruction code "mmmm s1" is not read. Thereby, the axes of the third control system m3 are not stopped and the machining such as the grooving PC-1 continues.

On the other hand, the control portion 21 may be configured not to start the front vibration machining PA-1 when the start instruction code "aaaa" and the axis to be stopped are read as the parameters in the machining program of the first control system m1 during the front finishing PC-2. In the case that the start instruction code "aaaa" is read after reading the declaration start instruction code "mmmm s1" and before reading the declaration end instruction code "mmmm s2", the control portion 21 is set in advance to stop reading the codes programmed after the start instruction code "aaaa". Thereby, the control portion 21 detects the termination of the front finishing PC-2 by reading the declaration end instruction code "mmmm s2" in the machining program of the third control system m3. Then, the control portion 21 reads the instruction codes programmed after the start instruction code "aaaa" and the front vibration machining PA-1 is started.

The control portion 21 sequentially executes the machining programs shown in FIG. 3 for the control systems to perform machining on the workpieces W. The axes X3 and Z3 are set as the axes to be stopped together with the start instruction code ("aaaa") for the front vibration machining PA-1 on the third workpiece W3 in the fixed module M1. Therefore, the operation of the front finishing PC-2 (precision machining) in the fixed module M3 is stopped when the front vibration machining PA-1 on the third workpiece W3 is started. The other machining (e.g. the grooving PC-1, etc) in the fixed module M3 and all machining in the movable module M2 can be performed in parallel with the front finishing PC-2 since the influence of the vibration can be ignored.

As described above, in this embodiment, only the execution of the machining where the influence of the vibration cannot be ignored is restricted while the execution of the machining where the influence of the vibration can be ignored is permitted. Accordingly, the plurality of machining can be executed in parallel in the modules M1, M2, M3 other than the restricted machining. Consequently, it is possible to provide the machine tool 100 which prevents the influence of the vibration or the like on machining accuracy and suppresses the increase in the cycle time of the entire machine tool 100, thereby the excellent machining accuracy and productivity can be achieved.

Further, in this embodiment, each of the machining programs for controlling the control systems includes the instruction codes to designate the machining to be restricted. Accordingly, the machining (e. g. finishing) easily affected by the vibration can be automatically restricted during the predetermined machining (e. g. vibration machining) since the control portion 21 executes the machining program for each of the control systems.

In this embodiment, the machining program is configured to stop a part of the finishing in the fixed module M3 during the vibration machining in the fixed module M1.

However, the present disclosure is not limited to this embodiment. For example, the vibration machining in the fixed module M1 may be stopped during the finishing in the fixed module M3. In this case, the axes to be stopped in the fixed module M1, for example X-axis ("X1") and Z-axis ("Z1"), may be set to a predetermined instruction code for the front finishing PC-2 in the fixed module M3 as a parameter, for example.

In addition, the instruction code to restrict the operation (e.g. machining) which affects the machining accuracy of other machining may be included before and after the instruction code group for the front vibration machining PA-1 in the fixed module M1. Thereby, only the operation which affects the finishing accuracy is stopped while the other operations (e.g. machining) maybe permitted during the finishing. Accordingly, it is possible to suppress the increase in the cycle time and prevents the vibration machining from affecting the finishing accuracy so that the machining accuracy and productivity can be improved.

Further, in this embodiment, one of the vibration machining and the finishing is restricted so that the vibration machining and the finishing are not performed in parallel. However, the machining to be restricted is not limited to the vibration machining and the finishing. The present disclosure is applicable when machining which may affect the machining accuracy of another machining exists. In this case, one of the machining which affects the machining accuracy of the other machining or the other machining may be restricted. Thereby, it is possible to suppress the increase in the cycle time and prevents the influence on the machining accuracy during the machining so that the machining accuracy and productivity can be improved.

Moreover, in this embodiment, when the user writes the machining programs, the predetermined instruction codes are included in the certain machining programs to designate the machining to be restricted during the predetermined machining. However, the restriction of the machining is not limited to this embodiment. Alternatively, the machining to be restricted may be designated on the machining schedule screen of the control systems, which is displayed on the display portion 23 of the operation panel 22.

Figure 4:
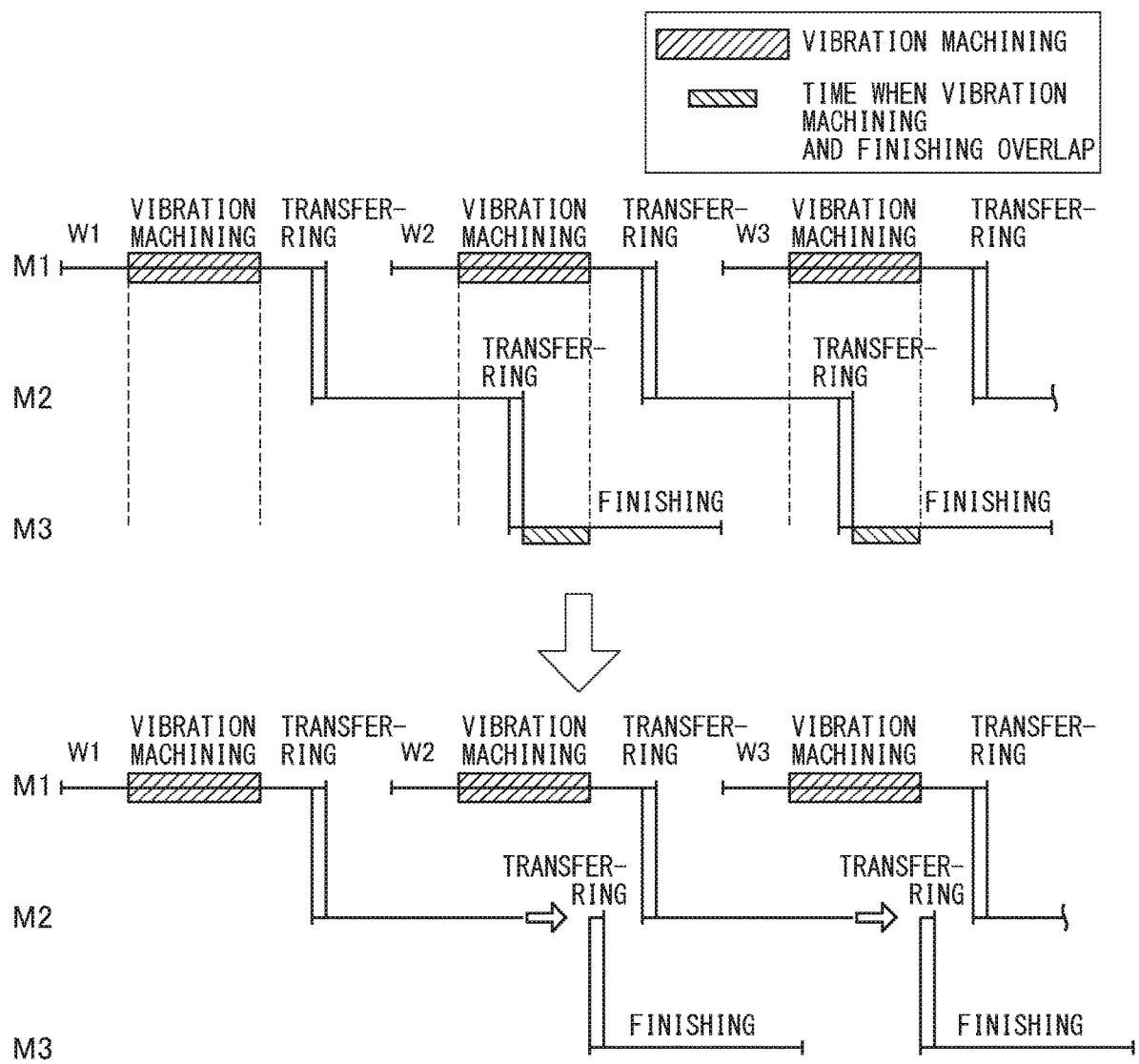
FIG. 4 illustrates a process chart for the control systems to be displayed on a schedule screen and a modified process chart to restrict a parallel execution of the vibration machining and the finishing according to a modification.

The upper view in FIG. 4 is the process chart illustrating the machining process of the control systems m1, m2, m3 (the modules M1, M2, M3) displayed on the schedule screen. It should be noted that the process charts in FIG. 4 are only examples and process charts to be displayed on the schedule screen are not limited to the ones shown in FIG. 4.

As shown in the process chart at the upper view of FIG. 4, the vibration machining in the first control system m1 and the finishing in the third control system m3 are partially performed in parallel. To prevent the influence of the vibration machining on the finishing accuracy, the time axis of the finishing in the fixed module M3 is adjusted or moved as shown at the bottom of FIG. 4 via the operating portion 24, which is the touch panel or the like, so that the finishing is not performed in parallel with the vibration machining. Through the adjustment of the machining process on the schedule screen, the machining programs are changed (updated) by moving the time axis or setting the parameters or the instruction codes for restricting the machining in the storing areas $1, $2 for the control systems. Accordingly, the restriction on the machining made on the schedule screen is reflected to the machining programs.

The finishing is restricted during the vibration machining via the schedule screen as described above, the machining in the second control system m2 (the movable module M2) is performed in parallel with the vibration machining. After the termination of the vibration machining, the finishing is started in the third control system m3 (the fixed module M3). Accordingly, it is possible to suppress the increase in the cycle time and prevents the vibration machining from affecting the machining accuracy to improve the finishing accuracy so that the machining accuracy and productivity can be improved.

Further, the machining process is displayed on the schedule screen in the time series. Accordingly, the user can easily recognize how the machining is performed in parallel with another machining in the machining process. Moreover, the user can easily adjust the machining process on the schedule screen without modifying the machining programs. Consequently, the machining can be controlled more easily, and the degree of freedom in adjusting the machining process can be increased.

The embodiment of the present disclosure has been described with reference to the drawings. The above embodiment is only an example of the present disclosure and the present disclosure is not limited to the configurations shown in the embodiment. Changes in design that do not depart from the gist of the present disclosure are included in the present disclosure.

In the above embodiment, the machine tool 100 includes the two fixed modules M1, M3 and the one movable module M2, but the machine tool of the present disclosure is not limited to the machine tool 100. For example, the present disclosure may be applied to a machine tool including two fixed modules and two movable modules, or a machine tool including one or more than three fixed modules and more than three movable modules. Further, only one type of product is continuously machined in the above embodiment, but the present disclosure is not limited to such product. The present disclosure may be applied to machining by which different types of products are continuously machined.

Moreover, in the above embodiment, the parallel execution of the predetermined machining and the machining affected by the predetermined machining is restricted. However, a parallel execution of the predetermined machining and a certain operation of the machine tool may be restricted if the certain operation affects the predetermined machining. For example, the certain operation is the acceleration and deceleration of the movable module which are not machining. In this case, the parallel execution of the predetermined machining and the acceleration and deceleration of the movable modules may be restricted, for example.

What is claimed is:

1. A machine tool that is a lathe, comprising:
a plurality of workpiece holders configured to hold a workpiece;
a plurality of working portions each configured to perform an operation on the workpiece, respectively;
a plurality of working portion holders corresponding to the plurality of workpiece holders; and
a control portion comprising a central processing unit (CPU) and a memory,
wherein the control portion is configured
to control the plurality of workpiece holders and the plurality of working portion holders so that the plurality of working portion holders hold respective working portions and the plurality of working portions perform the operations on the workpiece held by a corresponding workpiece holder, and
to control to restrict a parallel execution of a predetermined operation and an operation to be affected by the predetermined operation and to permit a parallel operation of operations other than restricted operations,
wherein the predetermined operation is vibration machining for cutting the workpiece by vibrating the working portion and the operation to be affected by the predetermined operation is finishing,
wherein only the execution of the finishing where the influence of the vibration cannot be ignored is restricted while the execution of machining and operations where the influence of the vibration can be ignored is permitted, and
wherein the machining and the operations where the influence of the vibration can be ignored comprise back machining, drilling, grooving, and transferring the workpiece.

2. The machine tool according to claim 1,
wherein the control portion comprises a plurality of control systems each configured to control a predetermined drive axis of the machine tool, and
wherein the control portion is configured
to control based on a machining program independently set to each of the plurality of control systems, and
to restrict the parallel execution of the predetermined operation and the operation to be affected by the predetermined operation based on an instruction code provided to the machining program.

3. The machine tool according to claim 2, further comprising:
a display portion configured to display an operation process of each of the plurality of control systems, and
an operating portion for input to change the operation process,
wherein the control portion is configured to display the operation process for each of the plurality of control systems on the display portion, and to control an execution of each of the operations in accordance with the operation process changed via the operating portion.

4. The machine tool according to claim 1, wherein
a workpiece holder of the plurality of workpiece holders is a main spindle,
a working portion of the plurality of working portions is a tool for machining the workpiece, and
a working portion holder of the plurality of working portion holders is a tool post configured to hold the tool.

5. The machine tool according to claim 1, wherein
the machine tool comprises a plurality of modules and is configured to perform machining on the workpiece while sequentially transferring the workpiece among the plurality of modules, and
each of the plurality of modules comprises a workpiece holder, a working portion, and a working portion holder.

6. The machine tool according to claim 5, wherein
the plurality of modules comprises a fixed module and a movable module, one of the fixed module and the movable module is configured to perform the vibration machining while another of the fixed module and the movable module is configured to perform the finishing.

* * * * *